Patented Jan. 12, 1954

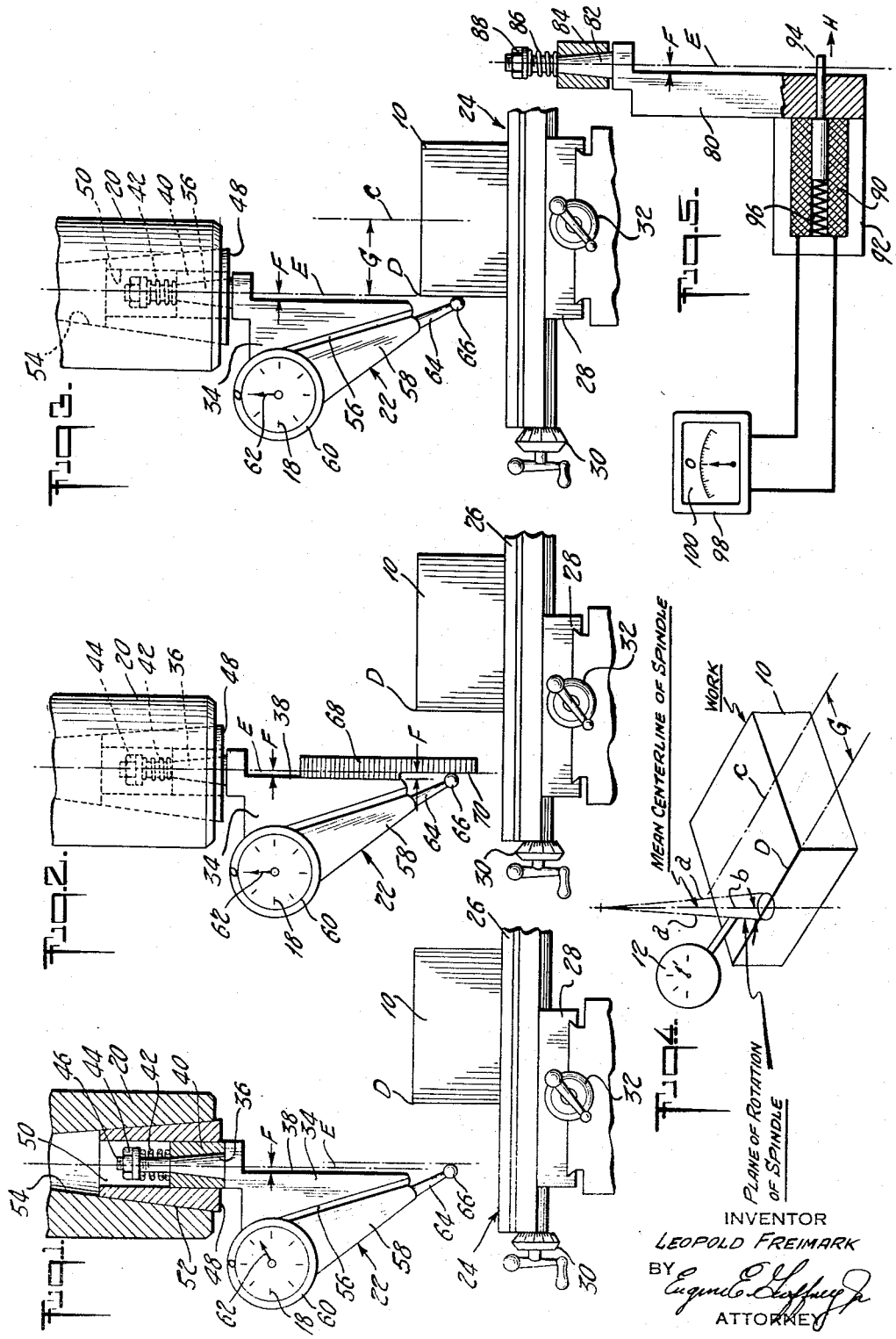

2,665,492

UNITED STATES PATENT OFFICE 2,665,492

EDGE ALIGNING OR LOCATING DEVICE AND METHOD

Leopold Freimark, New York, N. Y.

Application May 6, 1950, Serial No. 160,447

2 Claims. (Cl. 33—172)

This invention relates to measuring instruments for use in machining or otherwise working materials and more particularly concerns a measuring instrument for accurately locating a piece of material relative to a machine spindle or chuck preparatory to drilling, boring, grinding or other similar operations.

By way of amplification let it be assumed that a hole is to be drilled in a metal block and must be located to a fairly high order of accuracy. The accepted method is to locate one edge of the block with respect to the center line or axis of the drilling means so that the edge of the block is directly in line with that axis. The block is normally carried by a calibrated bed on the machine and upon location of one edge of the block relative to the mean center line of the drill, the bed can be displaced a predetermined distance so that the drill will form a hole at the desired distance from the edge of the block and within the order of accuracy of the calibrated means for displacing the machine bed. This locating procedure must of course be repeated for an adjoining block edge to accurately position the drill over a given point in the block at which the hole is to be formed. The device for locating the edge of a block relative to a machine spindle is commonly called an edge finder.

The primary difficulty in the location of holes has, to my knowledge, resided in the accurate location of the edge of a block to be drilled with respect to the center line of the drilling means and with usual apparatus the procedure for locating edges to within an order of accuracy of a few ten thousandths of an inch requires an hour or more of the machinist's time. Because of wear in the component parts of conventional measuring devices or edge finders it is sometimes difficult if not impossible to attain the order of accuracies required in the manufacture of dies and other similar precision products.

With this invention all the possibility of wear of the measuring equipment is substantially eliminated so that the machinist or other user of this equipment can rely upon the measured readings and further the time for locating the edge of a block with reference to drilling or boring apparatus is reduced to the order of five to ten minutes as compared to an hour or more with conventional methods. The above and other objects will become more apparent in the following description and accompanying drawings forming part of this application.

In the drawings,

Fig. 1 is a side elevation of an edge finder in accordance with the invention and is shown positioned in a drill chuck preparatory to locating the edge of a block;

Figs. 2 and 3 are similar to Fig. 1 and show successive steps in the location of the edge of a block in accordance with the invention;

Fig. 4 is a diagrammatic illustration of the location of the edge of a block in accordance with the invention;

Fig. 5 is another embodiment of the invention wherein electronic measuring means are employed.

The difficulty in the location of a block edge relative to a machine spindle is brought about by inaccuracies in the structure of the machine spindle whereby the true center line of the spindle describes a conical surface about a so-called mean center line and for accurate machining it is of course important that the edge of the block be alined coincident with this mean center line.

This condition is illustrated in Fig. 4 of the drawings wherein the locus of rotation of the spindle or chuck is indicated by the dotted lines A while the mean center line is indicated by the dotted line B. For present purposes let us assume that a hole is to be drilled in the work piece 10 and that the hole is to be positioned accurately on the line C. The first step in the procedure would be to accurately locate the edge D of the block with respect to the mean center line B of the spindle or drill. It is usual practice in alining the edge D of the block with the center line B of the spindle to use a suitable indicator 12 which is normally carried by the spindle. The conventional indicator used for this purpose is fastened rigidly in the collar or chuck so that it can be rotated with the spindle. The first step of the process would consist in approximately alining the actuating lever of an indicator with the approximate center line of the chuck and then bring the edge D of the block in contact with that indicator. A reading would be obtained and recorded and then the indicator and chuck would be rotated 180° and the edge D of the block would again be brought into contact with the indicator so that a similar reading would be obtained. This procedure of course involves the employment of a straight edge placed against the edge D of the block so as to contact the indicating arm which has been rotated with the chuck through the angle of 180°. The difference in the block positions must then be determined from the calibrated reading of the machine bed on which the block is fastened. The procedure is then repeated a number of times with successive re-alinement of the indicator 12 relative to the chuck until the displacement of the block relative to the indicator is reduced to a minimum with the two chuck settings. This procedure is of course time consuming and in actual practice requires an hour or more.

As will be seen applicant's invention reduces this time materially and enables the edge D of the block to be accurately positioned on the center line B within five to ten minutes.

In Figs. 1 to 3, inclusive, I have illustrated an edge locator in accordance with the invention with each figure showing one step in the location of one edge of the block 10 with reference to the mean center line of the chuck or collar 20. The indicator 22 and collar or chuck 20 have been illustrated on a somewhat larger scale than the machine table or bed 24 which carries the block 10.

The machine bed or table 24 is of conventional form with transversely movable carriages 26 and 28 for movement of the work 10 in both directions relative to the chuck or collar 20. The carriage 26 is provided with a calibrated dial 30 to indicate displacement of the bed in one direction, and the carriage 28 has a similar calibrated dial 32 for indicating the movement of the bed in the other direction. This structure is conventional and well known in the art and of itself forms no part of the invention.

The edge locator or finder 22 includes a triangularly shaped member 34 formed integrally with and offset from a conical or tapered section 36. The triangularly shaped member 34 has one edge 38 disposed parallel to a center line E determined by the axis of the tapered section 36 and offset therefrom a distance F. A tapered collar 40 cooperates with the tapered section 36 and is firmly held thereon by means of a spring 42 and a threaded nut 44 cooperating with a stud 46 extending from the upper surface of the taper 36. This structure permits the taper 36 to be rotated relative to the tapered collar 40 and at the same time to be free of any wobble or play relative to the collar 40.

Surrounding the collar 40 is a second collar 48 having a cylindrical opening 50 for forcibly receiving and holding the collar 40 and a tapered outer surface 52 that cooperates with the tapered opening 54 in the chuck or collar 20. With this structure the taper 36 is securely and accurately held by the collar 20 free of all play which might produce inaccuracies in the final measurements and at the same time is rotatable relative to the collar. The angularly disposed edge 56 of the triangular member 34 may be arranged in any suitable manner to hold an indicating means 58 having a rotatable dial 60 and an indicating pointer 62. Extending from the bottom of the indicator 58 is an actuating lever 64 terminating in a rounded or ball-shaped section 66 and movement of this lever 64 operates through a suitable mean translating system within the indicator housing to rotate the pointer 62 relative to the calibrations 18 on the dial 60.

After mounting the edge locator 22 in the collar 20 as shown in Fig. 1 and securing the block 10 on the machine bed 24 the indicator is then calibrated as shown in Fig. 2. It will be seen in Fig. 1 that the ball 66 on the end of the lever 64 extends beyond the center line E of the taper 36. The initial step in the process is to bring the righthand edge of the ball 66 in line with the center line E of the taper section 36. This is accomplished by means of a setting block 68 adapted to lie along the edge 38 of the triangular member 34 and having a recessed edge 70 displaced parallel to and a distance F from the surface of the block contacting the edge 38 of the member 34. In this way the righthand edge of the ball 66 is alined accurately with the center line E while the test block 68 is held in this position as shown in Fig. 2. The calibrated dial 60 is rotated to bring the zero mark of the scale in line with the position of the pointer 62. This procedure removes all the play in the indicator 22 so that the edge D of the block 10 can be readily located relative to the spindle or chuck 20 and this procedure is illustrated in Fig. 3.

The bed 24 of the machine is moved to the left so that the edge D of the block contacts the ball 66 of the indicator 22 and moves the ball 66 a distance sufficient to bring the pointer 62 coincident with the zero setting on the dial 60. Should the spindle 20 be off center so that a center line of the spindle which is coincident with the center line E of Figs. 1 to 3 moves in a conical path, the edge of the block D will now be alined with one edge of the described cone. To determine any error in the spindle 20 the indicating assembly 22 together with the triangular member 34 are held in position by hand and the spindle 20 is rotated approximately 180°. When this is done the ball member 66 will either move away from the edge D of the block or tend to be forced more tightly against it, depending on the position of the wobble in the spindle or chuck when the first measurement was made. Assuming, for instance, that in rotating the chuck 20 180° from its position in Fig. 3 that it tends to swing to the right, this will move the indicating pointer 62 a distance equivalent to the misalinement or wobble in the chuck. Assuming that the degree of wobble indicated is .002 inch, then the displacement of the bed to the left a distance of 1/1000 inch will bring it exactly in coincidence with the mean center line of the chuck as shown in Fig. 4. This can be checked by displacing the zero mark on the scale .001" and rotating the chuck or spindle 20 a number of times during which operation the pointer 62 should alternately move from .001 inch on one side of the zero mark of the indicator to .001 inch on the other side of the zero mark on the indicator.

It is believed clear that if upon making the original adjustment as described in connection with Fig. 3 that rotation of the spindle tends to move the indicator 22 away from the edge D of the block, the block should then be brought into contact with the ball 66 by displacement of the bed 24 so that the pointer 62 is coincident with the zero mark on the indicator. When this is accomplished the chuck is then rotated 180° whereupon the process described in connection with Fig. 3 is then followed.

It is readily seen that by means of this invention the edge of the block D may be accurately and precisely located relative to the mean center line of a chuck or spindle within a time considerably less than that required by ordinary methods and with an accuracy dependent wholly upon the accuracy of the indicating means 22.

Upon the location of the edge D of a block or other work piece it is merely necessary to displace the block relative to the chuck or spindle a given distance determined by the calibrated dial 30 or other known means on the bed 24 so as to bring the mean center line of the chuck accurately in line with a predetermined line on the surface of the block that is to be bored or drilled by means of a suitable tool fastened into the spindle 20. In the drawings we have indicated this line by the line C and the distance the block is moved is denoted by the arrow G.

It is apparent of course that a similar procedure must be carried out with respect to an edge of the block adjoining the edge D in order to accurately position the collar over a predetermined point in the block.

Fig. 5 illustrates another embodiment of my invention employing an electronic indicating means in place of the mechanical indicating means 22 shown in Figs. 1 to 3 inclusive.

In this embodiment of the invention the body portion 80 is the substantial equivalent of the body portion 34 in Figs. 1 to 3 and includes a taper 82, a rotatable collar 84 engaging said taper and a spring 86 and nut 88 for urging the collar 84 into contact with the taper 82. The main body portion 80 is offset from the center line E of the taper 82 a distance F in substantially the same manner as illustrated and described in connection with Figs. 1 to 3.

In place of the mechanical indicating means I have illustrated a variable inductance comprising a coil 90 enclosed within a suitable housing 92 and fastened securely to the lower end of the body 80 in any suitable manner. A pin 94 of magnetic material passes through a suitable opening in the body portion and through a central opening in the coil 90. A spring 96 urges the pin outwardly in the direction of the arrow H. As the pin 94 is moved inwardly and outwardly of the coil 90 the impedance of the coil is modified and this change of impedance is registered by any suitable electronic circuit responsive to changes in impedance. These circuits are well known in the art and have therefore been represented in this figure by the box 98 and the indicating meter 100 is of course calibrated in a suitable linear measurement to indicate displacement of the pin 94. As this device is used in a manner similar to the device described in connection in Figs. 1 to 3, further discussion of this form of the invention is deemed unnecessary.

I claim:

1. A device for locating a piece of material relative to a machine spindle comprising a body member having a flat gauging surface, means on said body member for rotatably holding it in said spindle for rotation about the spindle axis, with said flat gauging surface parallel to the center line of said spindle, indicating means carried by the body member including an actuating lever positioned to intersect both a plane coincident with said gauging surface and the center line of said spindle, and gauging means for determining the indicator reading with the end of the actuating lever touching the center line of the spindle.

2. A device for locating a piece of material relative to a machine spindle comprising a body member having a flat gauging surface, a conical member on said body with the longitudinal axis thereof parallel to and spaced from said gauging surface, a collar having a tapered opening therein to receive the conical member, spring means for holding the conical member in rotatable engagement with said collar, said collar being adapted to be held by the machine spindle, indicating means carried by the body member including an actuating lever positioned to intersect both a plane coincident with said gauging surface and the center line of said conical member and gauging means for determining the indicator reading with the end of the actuating lever touching the center line of the conical member.

LEOPOLD FREIMARK.

References Cited in the file of this patent

UNITED STATES PATENTS

| Number | Name | Date |
|---|---|---|
| 1,425,193 | Gates | Aug. 8, 1922 |
| 1,444,080 | Nyman | Feb. 6, 1923 |
| 1,723,529 | Schwieterman | Aug. 6, 1929 |
| 1,860,993 | Clarkson | May 31, 1932 |
| 1,953,614 | King | Apr. 3, 1934 |
| 1,994,497 | Winters | Mar. 19, 1935 |
| 2,074,990 | Roberts | Mar. 23, 1937 |
| 2,076,819 | Jones | Apr. 13, 1937 |
| 2,098,838 | Rusnak | Nov. 9, 1937 |
| 2,493,332 | Aubin | Jan. 3, 1950 |
| 2,533,198 | Radtke | Dec. 5, 1950 |